(12) United States Patent
Ray et al.

(10) Patent No.: US 11,323,438 B2
(45) Date of Patent: May 3, 2022

(54) PROTOCOL-AGNOSTIC CLAIM CONFIGURATION AND VERIFICATION

(71) Applicant: Microsoft Technology Licensing, LLC, Redmond, WA (US)

(72) Inventors: Mayukh Ray, Sammamish, WA (US); Jeevan Suresh Desarda, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

(21) Appl. No.: 16/696,462

(22) Filed: Nov. 26, 2019

(65) Prior Publication Data

US 2021/0160236 A1 May 27, 2021

(51) Int. Cl.
*H04L 9/32* (2006.01)
*H04L 29/06* (2006.01)

(52) U.S. Cl.
CPC ........ *H04L 63/0876* (2013.01); *H04L 9/3213* (2013.01); *H04L 9/3271* (2013.01); *H04L 63/20* (2013.01)

(58) Field of Classification Search
CPC . H04L 63/20; H04L 63/0876; H04L 63/0815; H04L 63/102; H04L 9/3213; H04L 9/3271; G06F 21/41
See application file for complete search history.

(56) References Cited

U.S. PATENT DOCUMENTS

| 7,917,647 | B2 * | 3/2011 | Cooper | ................... H04L 43/00 709/233 |
| 2005/0223413 | A1 * | 10/2005 | Duggan | ............... G06F 21/6236 726/3 |
| 2013/0042002 | A1 * | 2/2013 | Cheeniyil | ............... H04L 63/20 709/225 |
| 2013/0332984 | A1 * | 12/2013 | Sastry | ................... H04L 63/102 726/1 |

FOREIGN PATENT DOCUMENTS

EP  2761522 A2  8/2014

OTHER PUBLICATIONS

"International Search Report and Written Opinion Issued in PCT Application No. PCT/US20/059901", dated Feb. 12, 2021, 12 Pages. (MS# 407655-WO-PCT).

* cited by examiner

*Primary Examiner* — Khoi V Le
(74) *Attorney, Agent, or Firm* — Workman Nydegger

(57) ABSTRACT

Protocol-agnostic configuration of an identity claim policy that is to be implemented in one or more applications according to one of multiple identity authentication protocols and verification of the protocol-agnostic claims configuration. First, one or more protocol-agnostic identity claim policies are generated and applied to one or more applications. Each of the one or more applications implement one of the multiple identity authentication protocols. For each of the one or more applications, the implemented identity authentication policy is determined. Based on the (Continued)

determined identity authentication protocol, one or more identity claims of the corresponding application that corresponds to the at least one identity claim policy is then construed.

20 Claims, 12 Drawing Sheets

200B

```
<saml:AttributeStatement>
<saml:Attribute Name="userid" NameFormat="urn:oasis:names:tc:SAML:2.0:attrname-format:basic">
<saml:AttributeValue xsi:type="xs:string">abcd</saml:AttributeValue>
</saml:Attribute>
<saml:Attribute Name="mail" NameFormat="urn:oasis:names:tc:SAML:2.0:attrname-format:basic">
<saml:AttributeValue xsi:type="xs:string">mail@example.com</saml:AttributeValue>
</saml:Attribute>
<saml:Attribute Name="EmployeeID" NameFormat="urn:oasis:names:tc:SAML:2.0:attrname-format:basic">
<saml:AttributeValue xsi:type="xs:string">employer X</saml:AttributeValue>
<saml:AttributeValue xsi:type="xs:string">role Y</saml:AttributeValue>
</saml:Attribute>
</saml:AttributeStatement>
```

Encoded OIDC ID token:

eyJraWQiOiIxZTlnZGs3liwiYWxnljoiUlIMyNTYifQ.ewogImlzcy
I6ICJodHRwOi8vc2VydmVyLmV4YW1wbGUuY29tIiwKICJzd
WIiOiAiMjQ4Mjg5NzYxMDAxliwKICJhdWQiOiAiczZCaGRSa3
FOMyIsCiAibm9uY2UiOiAibi0wUzZfV3pBMk1qIiwKICJleHAi
OiAxMzExMjgxOTcwLAogImIhdCI6IDEzMTEyODA5NzAsCiAi
bmFtZSI6ICJKYW5lIERvZSIsCiAiZ2l2ZW5fbmFtZSI6ICJKYW5lIi
wKICJmYW1pbHlfbmFtZSI6ICJEb2UiLAogImdlbmRlciI6ICJm
ZW1hbGUiLAogImJpcnRoZGF0ZSI6ICIwMDAwLTEwLTMxliw
KICJlbWFpbCI6ICJqYW5lZG9lQGV4YW1wbGUuY29tliwKICJ
waWN0dXJlIjogImh0dHA6Ly9leGFtcGxlLmNvbS9qYW5lZG9l
L21lLmpwZyIKfQ.rHQjEmBqn9Jre0OlykYNnspA10Qql2rvx4F
sD00jwIB0Sym4NzpgvPKsDjn_wMkHxcp6ClIPcoKrWHcipR2i
AjzLvDNAReF97zolqq880ZD1bwY82JDauCXELVR9O6_B0w3
K-E7yM2macAAgNCUwtik6SjoSUZRcf-
O5IyglyLENx882p6MtmwaL1hd6qn5RZOQ0TLrOYu0532g9E
xxcm-
ChymrB4xLykpDj3IUivJt63eEGGN6DH5K6o33TcxkIjNrCD4XB
1CKKumZvCedgHHF3IAK4dVEDSUoGIH9z4pP_eWYNXvqQOj
Gs-rDaQzUHI6cQQWNiDpwOl_lxXjQEvQ

Decoded OIDC ID Token:

{
"iss": "http://server.example.com",
"sub": "24828976100l",
"aud": "s6BhdRkqt3",
"nonce": "n-0S6_WzA2Mj",
"exp": 1311281970,
"iat": 1311280970,
"name": "Jane Doe",
"given_name": "Jane",
"family_name": "Doe",
"gender": "female",
"birthdate": "0000-10-31",
"email": "janedoe@example.com",
"picture": "http://example.com/janedoe/me.jpg"
}

FIG. 3C

PROTOCOL-AGNOSTIC CLAIM CONFIGURATION AND VERIFICATION

BACKGROUND

Identity management (also called identity provider) includes the task of controlling information about users of various computing systems, including digital identities. Digital identity is an entity's online presence that may encompass personal identifying information (PII) and ancillary information (e.g., metadata). It may include the codification of identity names and attributes of a physical instance in a way that facilitates processing. Such information may include information that authenticates the identity of a user, and information that describes data and actions they are authorized to access and/or perform. It may also include the management of descriptive information about the user and how and by whom that information can be accessed and/or modified. Managed entities may include users, hardware devices, software applications, and/or network resources.

For example, identity management can involve various service functions, such as providing personalized, role-based, online, on-demand, content, and/or presence-based services to users and their devices. Identity management can also involve identity federation, such as relying on federated identity to authenticate a user without knowing his or her password. A federated identity in information technology is the means of linking a person's various digital identities and attributes, which may be stored across multiple distinct identity providers.

In a federated identity management, various policies, practices, and protocols may be implemented for exchanging authentication and authorization data between parties. For example, Security Assertion Markup Language (SAML) is an XML-based markup language for security assertions that service providers may use to make access-control decisions. As another example, OpenID Connect (OIDC) is another protocol that allows computing clients to verify the identity of an end-user based on the authentication performed by an authorization server. An application can choose to implement any identity authentication protocols that best fits the purpose of the application. Once the identity authentication protocol is determined, the policies are then defined and entered into the identity management service based on the format and requirements of the identity authentication protocol.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to protocol-agnostic configuring an identity claim policy that is to be applied to an application, such as a relying party application according to one of multiple identity authentication protocols. First, one or more identity claim policies are generated. One of the one or more identity claim policies is then applied to one or more applications. A claim policy includes one or more rule definitions for generating claims. Each of the one or more applications implements a particular identity authentication protocol that is one of the multiple identity authentication protocols.

In particular, for each of the one or more applications, the identity authentication protocol that is used by the corresponding application is determined. Based on the determined identity authentication protocol, one or more identity claims of the corresponding application is construed to correspond to the at least one identity claim policy.

In some embodiments, a user interface is displayed, and a user may be allowed to input, at the user interface, each of the one or more identity claim policies regardless of which identity authentication protocol is (or is to be) implemented at any particular application. A user may be allowed to input at the user interface to copy an existing identity claim policy. When the existing identity claim policy is copied, a new identity claim policy that is identical to the existing identity claim policy is generated. A user may also be allowed to modify an existing identity claim policy. Once the one or more identity claim policies are entered, a user may then be allowed to select one or more identity claim policies and one or more applications at the user interface and apply the selected one or more identity claim policies to the selected one or more applications.

For example, a user may copy an existing identity claim policy, and then modify the copied existing identity claim policy to create a new distinct identity claim policy. The user can then apply the new distinct identity claim policy to any number of applications regardless of which identity authentication protocol is (or is to be) implemented at each of these applications.

In some embodiments, after applying an identity claim policy to any application, the identity claim policy may be tested via a testing application. First, a test application may be launched. For each of the multiple protocols, a test request for accessing the test application may be generated. In response to the test request, a security token of the corresponding protocol may be received. The security token includes one or more identity claims. Once the security token is received, the one or more identity claims contained in the security token are decoded. The decoded one or more identity claims may then be displayed to a user.

Existing identity providers often require users to generate a separate identity claim policy for each application. As such, an application service provider is often required to create and maintain a claim policy for each application, which is cumbersome if the same claim policy needs to be applied to a different application.

Additionally, existing identity providers often require users to use different user interface for different authentication protocols. For example, if an application implements SAML protocol, a user is often required to use a SAML specific portal to define or update the set of identity claim policy for the particular application; if an application implements OIDC protocol, a user is often required to use an OIDC specific user interface (e.g., a command-line shell) to define or update the identity policy for the particular application. It is burdensome for users to familiarize with various user interfaces, claim formats, and commands for generating identity claims for different applications.

The principles described herein improve the functions of identity management systems by removing the requirement of the users to have to learn and use different user interfaces and/or portals to set up identity claim policies for each application depending on the protocols implemented in the application. Instead, the users are allowed to simply define a set of identity claim policies, and apply the set of identity claims to any number of applications, regardless of the protocol implemented in each application.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 2B illustrates an example set of identity claims that may be embedded in a security token under the SAML protocol;

FIG. 3B illustrates an example encoded OIDC ID token that is an ASCII string;

FIG. 3C illustrates an example decoded OIDC ID token that is in JSON format;

DETAILED DESCRIPTION

Figure 1:
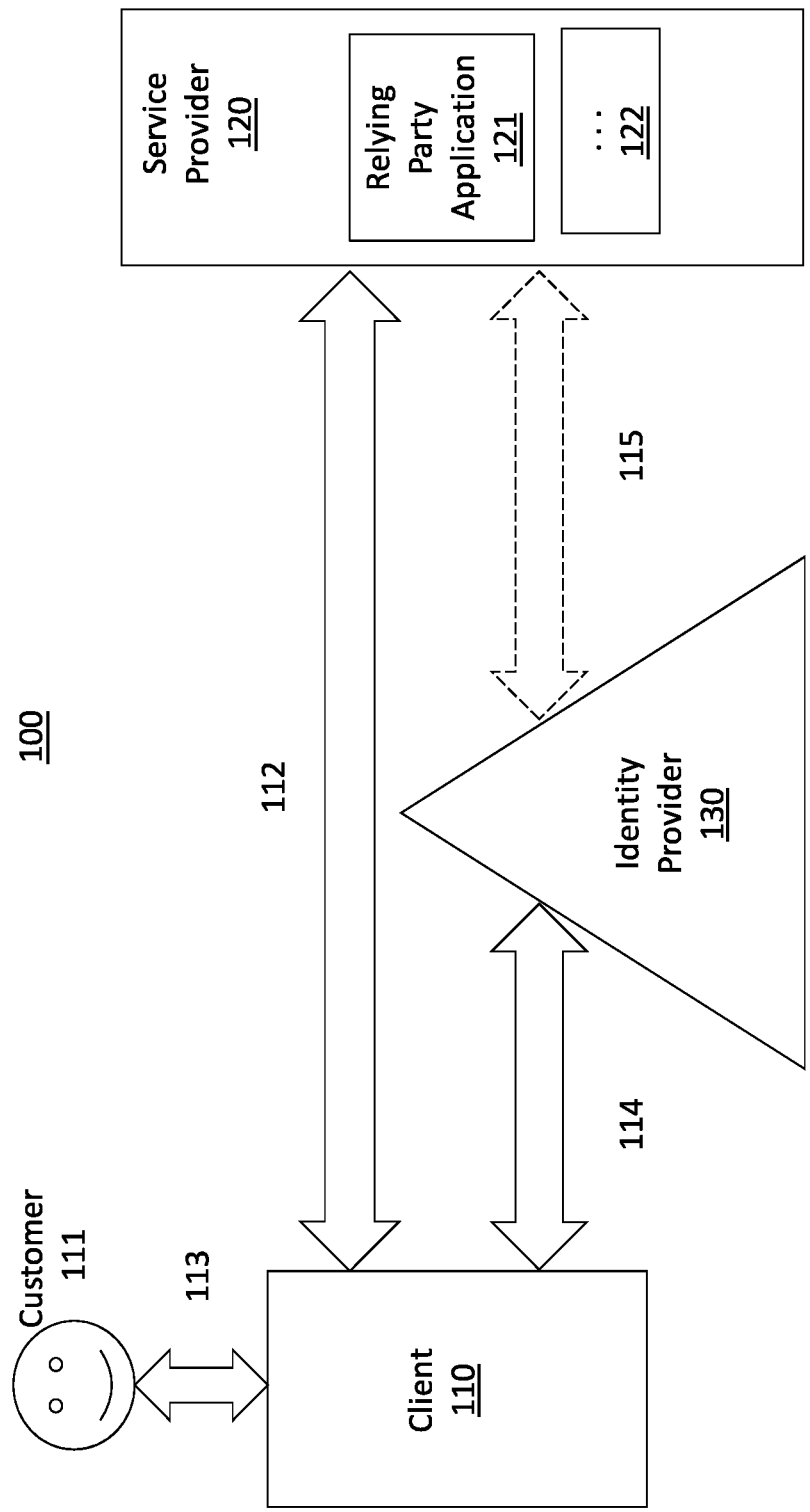
FIG. 1 illustrates an example environment where identity claims may be issued by an identity provider when a client requests for accessing an application provided by a service provider.

The embodiments described herein are related to protocol-agnostic configuring an identity claim policy that is to be applied to an application, such as a relying party application according to one of multiple identity authentication protocols. First, one or more identity claim policies are generated. At least one of the one or more identity claim policies is then applied to one or more applications. Each of the one or more applications implements a particular identity authentication protocol that is one of the multiple identity authentication protocols.

In particular, for each of the one or more applications, the identity authentication protocol that is used by the corresponding application is determined. Based on the determined identity authentication protocol, one or more identity claims of the corresponding application is construed to correspond to the at least one identity claim policy.

In some embodiments, a user interface is displayed, and a user may be allowed to input, at the user interface, each of the one or more identity claim policies regardless of which identity authentication protocol is (or is to be) implemented at any particular application. A user may be allowed to input at the user interface to copy an existing identity claim policy. When the existing identity claim policy is copied, a new identity claim policy that is identical to the existing identity claim policy is generated. A user may also be allowed to modify an existing identity claim policy. Once the one or more identity claim policies are entered, a user may then be allowed to select one or more identity claim policies and one or more applications at the user interface and apply the selected one or more identity claim policies to the selected one or more applications.

For example, a user may copy an existing identity claim policy, and then modify the copied existing identity claim policy to create a new distinct identity claim policy. The user can then apply the new distinct identity claim policy to any number of applications regardless of which identity authentication protocol is (or is to be) implemented at each of these applications.

A claim policy may include one or more rule definitions for generating claims. For example, a rule definition may define a claim type by mapping a user attribute or a group attribute to the claim type. The mapped pair of the user attribute and claim type may become a part of the claim policy, such that the outgoing security token would include a claim that asserts the user attribute in the defined claim type.

Further, in some embodiments, the applying the at least one identity claim policy may include performing one or more transformations on the included at least one user attribute or group attribute or any constant value contained in the defined identity claim policy. The one or more transformations may include, but are not limited to: (1) an extraction transformation, (2) a regular text replacement transformation, (3) a to-upper-case transformation, and (4) a to-lower-case transformation.

In some embodiments, after applying an identity claim policy to any application, the identity claim policy may be tested via a testing application. First, a test application may be launched. For each of the multiple protocols, a test request for accessing the test application may be generated. In response to the test request, a security token of the corresponding protocol may be received. The security token includes one or more identity claims. Once the security token is received, the one or more identity claims contained in the security token are decoded. The decoded one or more identity claims may then be displayed to a user.

Existing identity providers often require users to generate a separate identity claim policy for each application. As such, an application service provider is often required to create and maintain a claim policy for each application.

Additionally, existing identity providers often require users to use different user interfaces for different authentication protocols. For example, if an application implements SAML protocol, a user is often required to use a SAML specific portal to define or update the set of identity claim policy for the particular application; if an application implements OIDC protocol, a user is often required to use an OIDC specific user interface (e.g., a command-line shell) to define or update the identity policy for the particular application. It is burdensome for users to familiarize with various user interfaces, claim formats, and commands for generating identity claims for different applications.

The principles described herein improve the functions of identity management service systems by removing the requirement of the users to have to learn and use different user interfaces and/or portals to set up identity claim policies for each application depending on the protocols implemented in the application. Instead, the users are allowed to simply define a set of identity claim policies, and apply the set of identity claims to any number of applications, regardless of the protocol implemented in each application.

FIG. 1 illustrates an example environment 100 that includes a service provider 120, an identity provider 130, and a client 110. The client 110 may be a web browser, a desktop application, and/or a mobile application. The service provider 120 may be providing multiple applications or services 121 to the customers. The ellipsis 122 represents that there may be any number of applications or services provided by the same service provider 120. When a customer 111 accesses an application 121 provided by the service provider 120 via the client 110, the customer 111 is often required to enter his/her credentials. A common credential includes a username and password. The username specifies who the customer is, and the password proves the customer is who he/she says he/she is. After it is proved that the username and the password match, the service provider 120 can then give the customer access to the service.

It may appear to the customer 111 that the service provider 120 determines whether the username and the password match. However, in a modern secure web service environment 100, the customer's username and password are often managed by an identity provider 130. Just like when you show your photo ID (e.g., driver's license) to another person, the other person believes you, because the driver's license is issued by a government entity, who has information about you and has verified such information to be true. In that sense, the identity provider 130 acts as an online federation that governs and manages the identities of many users. As such, common standards and protocols to manage and map user identities between identity providers across organizations (and security domains) are sometimes called "federation."

As illustrated in FIG. 1, when the customer 111 requests for accessing the service provided by the service provider 120, the service provider 120 may require the customer 111 to prove his/her identity via the identity provider 130. For example, the customer 111 may be redirected to a customer login interface provided by the identity provider 130. The customer 111 can then enter his/her username and password at the interface. The identity provider 130 receives the username and password entered by the customer 111 and determines whether the username and password match. If the username and password match, the identity provider 130 then causes a response or a security token to be generated. The response or the security token often includes one or more identity claims that are related to the user, which has been authenticated by the identity provider 130.

An identity claim is a piece of identity information about a user, such as name, email address, age, membership in a particular role (e.g., executive). The more claims the service provider 120 receives, the more the service provider 120 will know about the user. As such, the service provider 120 does not need to look up the user's attributes in a directory. Instead, the identity provider 130 generates the claims, and the service provider 120 examines them. Each claim has an issuer. The service provider 120 trusts the claim only as much as it trusts the issuer. For example, the service provider 120 would probably trust a claim made by an employer's domain controller more than it trusts a claim made by the user himself/herself. The identity provider 130 presents claims with a claim type, which has an issuer property that allows the service provider to find out who issued the claim. The claims are then wrapped into a security token, which encrypts, encode, and/or signs the claims.

When the service provider 120 builds an application that relies on claims, the service provider 120 is building a relying party application 121, which is also called a "claim-aware application" or "claims-based application" (hereinafter also referred to as "application" or "service"). A relying party application consumes the security tokens and extracts the claims from the security tokens to use them for identity-related tasks. In order to make all of this interoperable, the relying party application 121 needs to choose an identity authentication protocol and configure a claim policy that is to be implemented with the identity provider 130. The authentication protocol determines how to request and receive security tokens, and the claim policy determines what type of claims and/or identity information is required by the relying party application. For example, the relying party application 121 may require a user's email address, principal name (UPN), and/or last name to be included in the identity claims.

Based on the protocol and the claim policy specified by the application 121, after the identity provider 130 authenticates the user, the identity provider issues a claim that complies with the application's claim policy. Depending on the implemented protocol, the identity provider 130 may send a response or token containing the claim to the client 110, and the client 110 then presents the response or token to the relying party application 121. Alternatively, or in addition, the identity provider 130 may require the customer 111 to expressly grant permission for the service provider 120 to have access to certain user information before sending the response or token to the client 110 or directly to the service provider 120.

Different authentication processes and token formats are implemented in different identity authentication protocols. Depending on the use case, a service provider may determine which protocol is to be implemented in each application. For example, Security Assertion Markup Language (SAML) and OpenID Connect (OIDC) are two commonly implemented protocols.

Figure 2A:
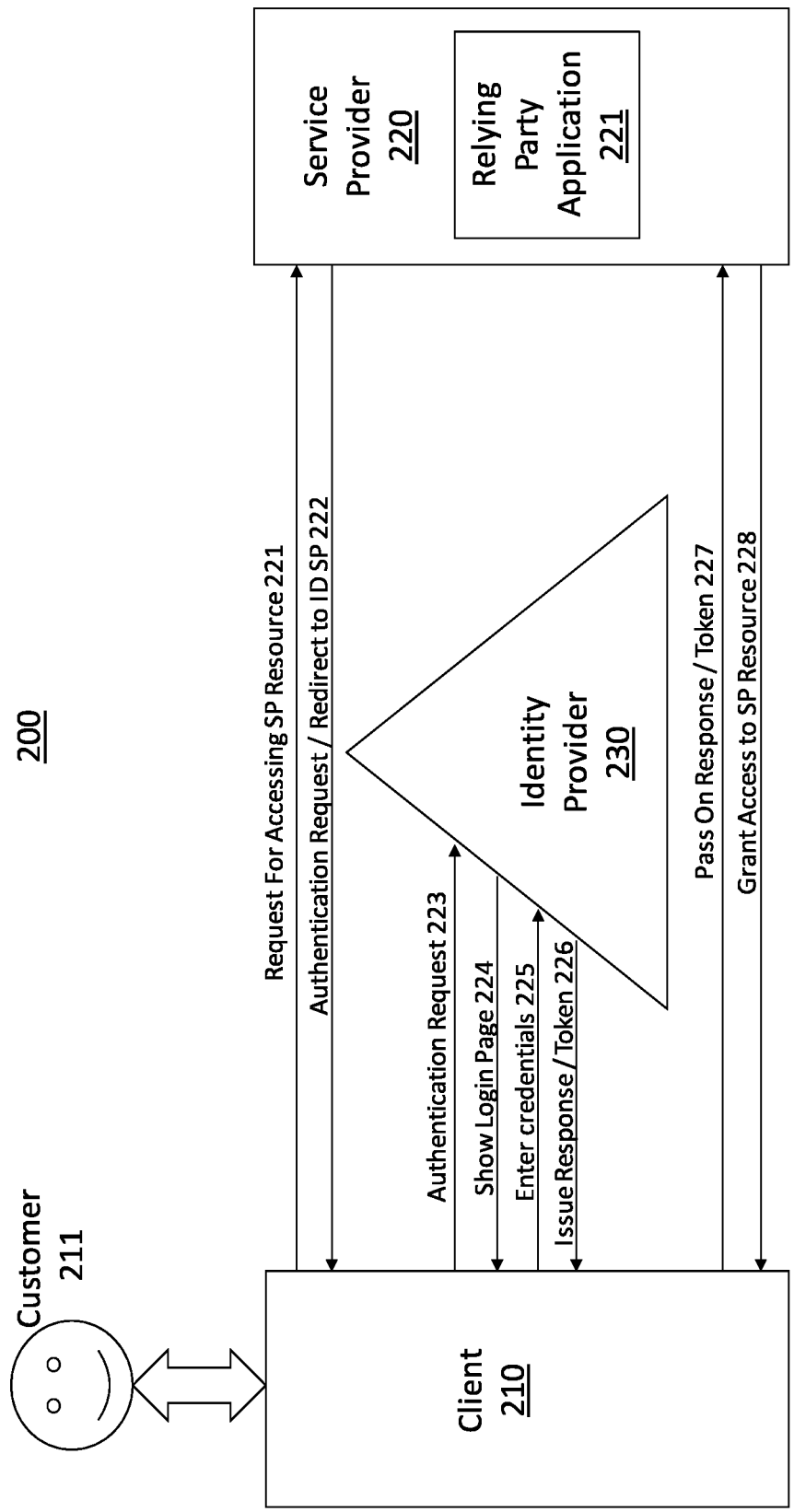
FIG. 2A illustrates an example communication flow that may occur amongst a client, an identity provider, and a relying party application when the SAML protocol is implemented at the relying party application.

Since SAML and OICD are commonly implemented in applications, we will provide a brief introduction to these two protocols with respect to FIGS. 2A through 3C. FIG. 2A is a diagram that illustrates example communication flows that may occur amongst a client 210, an identity provider 230, and a relying party application 221 when the SAML protocol is implemented at the relying party application 221. The client 210, the service provider 220, the relying party application 221, and the identity provider 230 may correspond to the respective client 110, service provider 120, relying party application 121, and identity provider 130 of FIG. 1.

When a customer 211 requests for access resource from the relying party application 221 via the client 210 (represented by arrow 211), the relying party application 221 generates a SAML authentication request, and redirect the client 210 to the identity provider 230 (represented by arrow 222). The client 210 then redirects the authentication request to the identity provider 230 (represented by arrow 223). In response to the authentication request, the identity provider 230 displays a login page at the client 210 (represented by arrow 224). The customer 211 can then enter his/her username and password at the displayed login page (represented by arrow 225). The identity provider 230 verifies the user-entered username and password first, then issues a response or token (represented by arrow 226). The client 210 receives the response or token from the identity provider 230, and then passes on the response or token to the relying party application 221 (represented by arrow 227). Once the relying party application 221 receives the security token, the relying party application 221 decodes the security token to obtain the identity claims contained therein, and then grants the client 210 access to the requested resource (represented by arrow 228).

Under the SAML protocol, the response/token is required to be written in XML format. The authenticated identity claims embedded in the SAML response are also written in XML format. FIG. 2B illustrates an example set of identity claims 200B that may be embedded in a security token under the SAML protocol. As illustrated in FIG. 2B, the identity claims may be asserted in an attribute statement. The attribute statement may have one or more attribute elements, including "userid", "mail", and "EmployeeID". The "userid" attribute may indicate the user ID of the subject user. For example, the user ID of the authenticated user may be "abcd". The "mail" attribute may indicate the email address of the user. For example, the email address of the user may be mail@example.com. The "EmployeeID" may indicate the user's employment affiliation and role at the employer's organization. For example, the user's employer may be "employer X", and his/her role at the employer's organization may be "role Y".

Figure 3A:
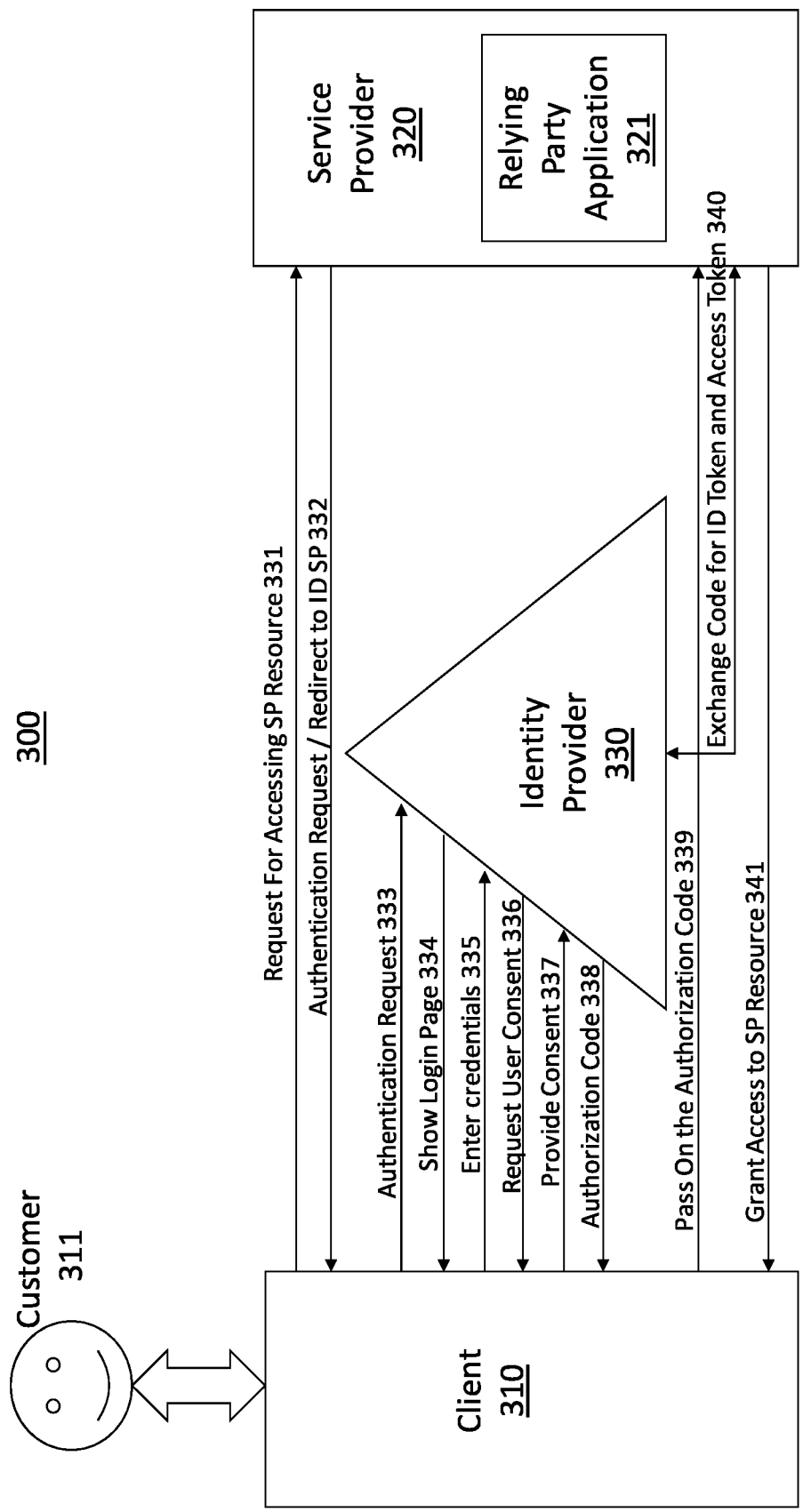
FIG. 3A illustrates an example communication flow that may occur amongst a client, an identity provider, and a relying party application when the OIDC protocol is implemented at the relying party application.

In addition to the SAML protocol, the OIDC protocol is another commonly implemented protocol. FIG. 3A is a diagram that illustrates example communication flows that may occur amongst a client 310, an identity provider 330, and a relying party application 321 when the OIDC protocol is implemented. The client 310, the service provider 320, the relying party application 321, and the identity provider 330 may correspond to the respective client 110, service provider 120, relying party application 121, and identity provider 130 of FIG. 1.

As illustrated in FIG. 3A, when the client 310 requests for accessing a resource from the relying party application 321 (represented by arrow 331), the relying party application 321 generates an OIDC authentication request and instructs the client 310 to redirect authentication request to the identity provider 330 (represented by arrow 332). The OIDC authentication request includes one or more parameters or attributes related to the user that the service provider would like to obtain. The client 310 then redirects the authentication requests to the identity provider 330 (represented by arrow 333). In response to receiving the authentication request, the identity provider 330 displays a login page at the client 310 (represented by arrow 334). The customer 311 then enters his/her credentials (e.g., username and password) at the login page (arrow 335).

After the identity provider 330 receives and verifies the customer's credentials, the identity provider 330 then requests the user to consent to allow the relying party application 321 to access the requested parameters or attributes (represented by arrow 336). If the customer 311 provides the consent (represented by arrow 337), the identity provider 330 then sends the client 310 an authorization code and redirect the client 310 back to the relying party application 321 (represented by arrow 338).

The client 310 then passes on the authorization code to the relying party application 321 (represented by arrow 339). The relying party application 321 then presents the authorization code to the identity provider 330 to obtain ID token, access token and/or refresh token (arrow 340). The relying party application 321 can then decode the ID token and/or access token to obtain the parameters or attributes of the user (i.e., the claims). After the relying party application 321 obtains the parameters or attributes of the user, the relying party application 321 may grant the client 310 the access to the requested resource (arrow 341).

Under the OIDC protocol, the ID token is written in JSON web token (JWT) format. The JSON web token is then encoded into ASCII strings. For example, base64url may be used to encode a JSON web token. FIG. 3B illustrates an example encoded OIDC ID token 300B, and FIG. 3C illustrates an example decoded OICD ID token 300C. As illustrated in FIG. 3B, the encoded OICD ID token is a long ASCII string, that is hardly understandable by any human. The decoded OICD ID token is in JSON format, which includes various attributes and parameters that are related to the user. For example, as illustrated in FIG. 3C, the ID token includes the claim issuer, the user's name, gender, date of birth, email, and a URL to the user's picture. Based on the ID Token, the relying party application 321 knows that the claim issuer is http://server.example.com, that the user's name is Jane Doe, that she is a female, that she is born on Oct. 31, 2000, that her email is janedoe@example.com, and that her picture can be accessed at http://example.com/janedoe/me.jpg.

As briefly discussed above, no matter what protocol the service provider 120 chooses to implement in each relying party application 121, the service provider 120 also needs to configure the claim policy for each application 121. Claim policies define how claims are construed, and what information is required to be authenticated. For example, the relying party application 321 may require the claims to include an authenticated email address.

Figure 4:
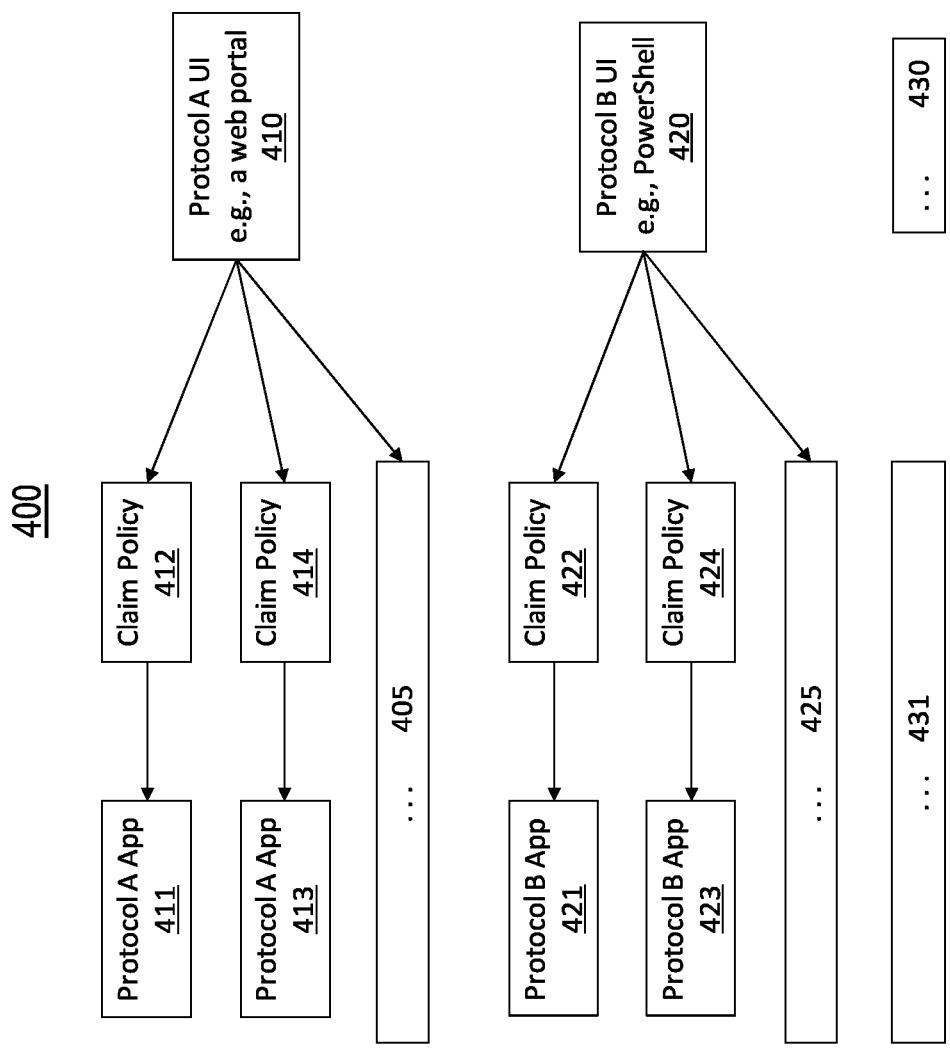
FIG. 4 illustrates an example environment, in which various identity claim policies are being configured for various applications.

Existing identity providers often require a user to manually configure a claim policy for each application. FIG. 4 illustrates such an example environment 400, in which various identity claim policies are being configured for various applications. As illustrated in FIG. 4, different user interfaces may be available for applications that implement different identity authentication protocols. For example, a web portal 410 may be used for configuring claim policies for applications 411, 413 that implement protocol A. PowerShell 420 may be used for configuring claim policies for applications 421, 422 that implement protocol B. The ellipsis 430 and 431 represent that there may be any number of additional identity authentication protocols that may be implemented by various applications.

As illustrated in FIG. 4, in the existing environment 400, a service provider providing applications and services to users may be required to configure claim policies for each of its applications separately. For example, for protocol A application 411, the service provider may be required to manually set up the particular claim policy 412; for protocol B application 413, the service provider may also be required to manually set up the particular claim policy 414. The ellipsis 405 represents that there may be any number of applications that implement protocol A, and each of these applications needs to have its particular claim policy set up manually via the web portal 410. Similarly, for protocol B application 421, the service provider may be required to manually set up the particular claim policy 422; for protocol B application 423, the service provider may also be required to manually set up the particular claim policy 424. The ellipsis 425 represents that there may be any number of applications that implement protocol B, and each of these applications needs to have its particular claim policy set up manually via PowerShell 420.

As such, in the existing environment 400, the users (e.g., programmers or IT professionals) at the service provider are required to be familiar with both the web portal 410 and the commands of Powershell 420 to be able to configure and/or modify the claim policies. Such a requirement is not only burdensome but also error-prone. The principles described herein improve the identity provider or identity management system by reducing the skill level and time required by the users at the service provider to set up the claim policies for applications. In particular, the principles described herein provide a single user interface that is protocol agnostic. The service provider can input the claim policies from the single user interface without having to know which particular identity authentication protocol is to be or has been implemented in any particular application. Further, each claim policy can be copied or modified, and be applied to multiple applications.

Figure 5:
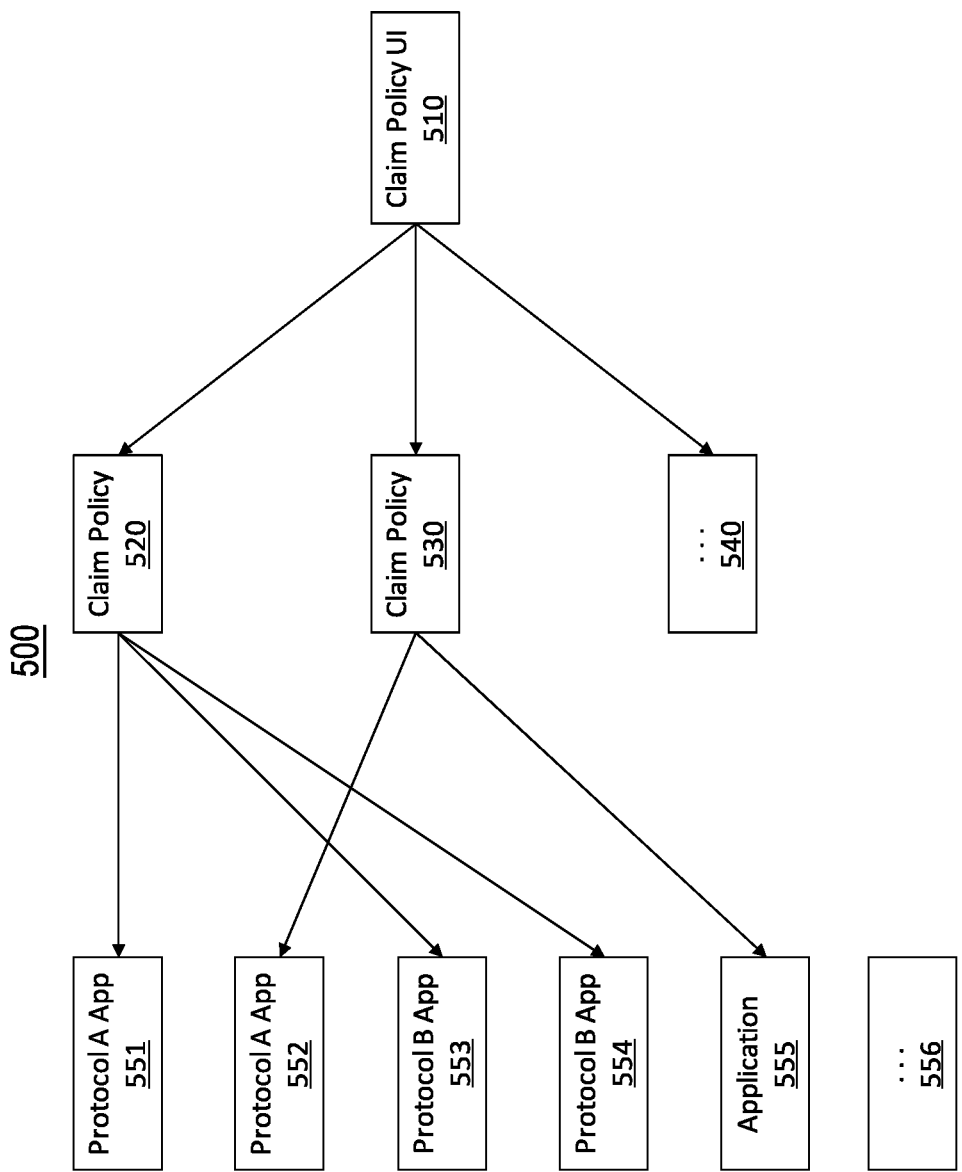
FIG. 5 illustrates an example environment that implements a single protocol-agnostic user interface that allows service providers to define claim policies regardless of the identity authentication protocol implemented in any particular application.

FIG. 5 illustrates an example environment 500, which implements the single protocol-agnostic user interface 510 that allows service providers to define claim policies regardless of the identity authentication protocol implemented in any particular application. For example, the service provider may define claim policy 520 and claim policy 530. The ellipsis 540 represents that there may be any number of claim policies that are defined by the same service provider. The service provider may then apply the claim policy 520 to protocol A application 551, protocol B application 553, and protocol B application 554. Similarly, the service provider may apply the claim policy 530 to protocol A application 552, and application 555. The ellipsis 556 represents that there may be any number of applications that implement any identity authentication protocols, and any defined claim policy 540 may be applied to any one of these applications.

The user at the service provider does not need to specify or know about which identity authentication policy is actually implemented at each of the applications 551-556. The identity provider identifies the protocol of each of the applications 551-556, and based on the determined protocol, the identity provider implements the claim policies to the corresponding applications based on the corresponding protocol.

Figure 6:
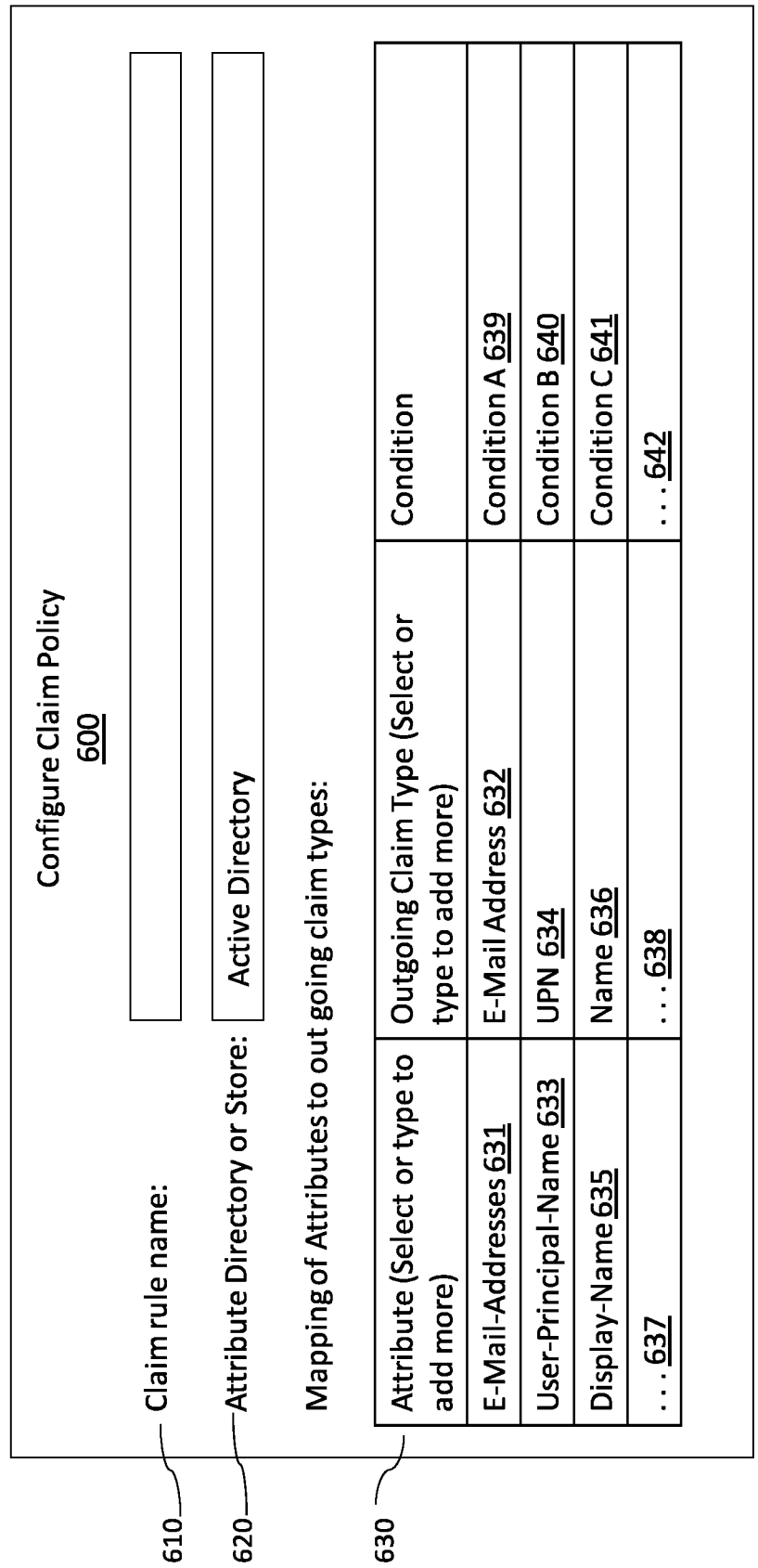
FIG. 6 illustrates an example user interface that allows a user of a service provider to define or configure claim policies without knowing the identity authentication protocol implemented at any application.

FIG. 6 illustrates an example user interface 600 that allows a user of the service provider to define or configure claim policies without knowing the identity authentication protocol implemented at any application. The user of the service provider may be a computer programmer or any IT professional that is tasked to configure the claim policies for one or more applications provided by the service provider. A claim policy may include one or more rule definitions for generating claims. For example, a rule definition may define a claim type by mapping a user attribute or a group attribute to the claim type. The mapped pair of the user attribute and claim type may become a part of the claim policy, such that the outgoing security token would include a claim that asserts the user attribute in the defined claim type. For example, the user interface 600 may include a claim rule name field 610 that allows the user to name each new claim rule. The user interface 600 may also includes an attribute directory or store field 620 that allows the user of the service provider to select or type in directories or databases that an organization uses to store its user accounts and their associated attribute values. For example, Active Directory may be selected. Active Directory is a directory owned by Microsoft that includes all users that log into a computer that is part of a windows domain.

The user interface 600 may also include a mapping table 630 that allows the service provider to select or type in one or more user attributes and respective outgoing claim types. For example, the service provider can select attribute "E-Mail-Addresses" 631 to be included in claim type "E-Mail Address" 632, the service provider can also select attribute "User-Principal-Name"633 to be included in claim type "UPN" 634, and service provider can also select attribute "Display-Name" 635 to be included in claim type "Name" 636.

Further, some claim definitions may further include one or more conditions 639, 640, 641. For example, as illustrated in FIG. 6, the "E-Mail Address" 632 claim type may include condition A 639 and condition B 640. When one or more conditions are included in a claim definition, only when the conditions are satisfied, a claim may be emitted in a security token. For example, a condition (e.g., condition A 639) may require only claim values that match a specific e-mail suffix value. When such a condition is required, only if the incoming claim type equals the specified claim type, and its value begins with the specified claim value, the claim will be emitted in a token. As another, a condition (e.g., condition B 640) may require a specific claim value. When such a condition is required, only if the incoming claim type equals the specified claim type, and its value equals the specified claim value, then the claim will be emitted in a token. As yet another example, a condition (e.g., condition C 641) may be passing through only claim values that start with a specific value. If incoming claim type equals the specified claim type, and its value begins with the specified claim value, the claim will be emitted in a token. When there is no additional condition, all claim values will be emitted in a token, as long as the claim type equals the specified claim type.

The ellipses 637, 638, 642 represent that additional claim rule definitions may be entered to be part of the claim policy. The user interface 600 is merely an example. Additional user input fields may be included in the user interface 600. For example, the service provider may also be allowed to enter one or more group attributes and respective outgoing claim types. Further, different layouts and graphic features may also be implemented in the user interface 600. For example, the conditions 639, 640, 641 may not be organized in the same table as the attribute and claim type. The conditions may be defined as a separate category or through a separate user interface, and a user can select various conditions to be applied to various claim types.

Figure 7:
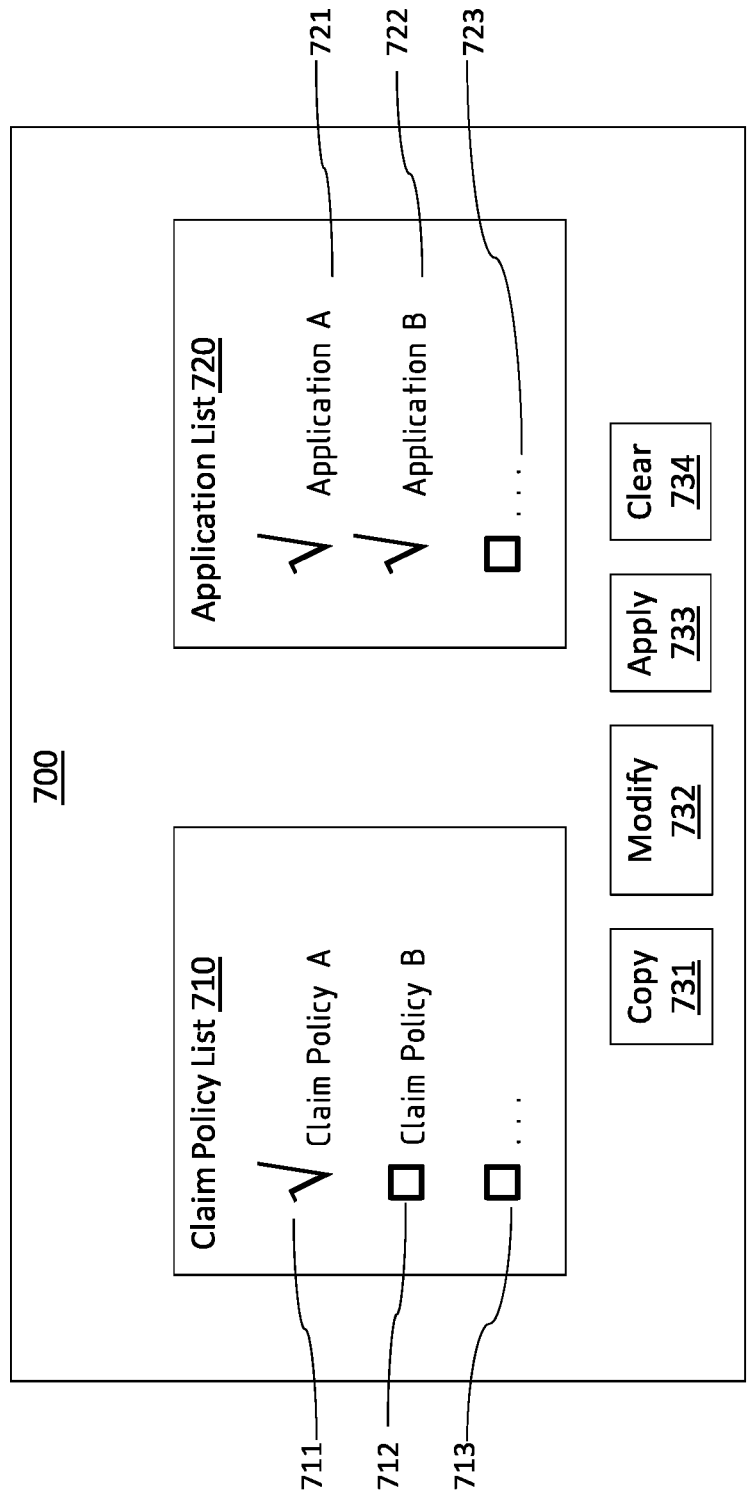
FIG. 7 illustrates an example user interface that allows a user of a service provider to apply a claim policy to one or more applications.

After one or more claim policies are defined, the service provider may be allowed then apply the defined claim policies to one or more applications. FIG. 7 illustrates an example user interface 700 that displays a claim policy list 710 and an application list 720. The claim policy list 710 includes claim policy A 711 and claim policy 712, each of which may be previously configured via user interface 600 of FIG. 6. The ellipsis 713 represents that there may be any number of claim policies defined and listed on the claim policy list 710. The application list 720 includes application A 721 and application B 722. The ellipsis 723 represents that there may be any number of applications listed on the application list 720.

The user at the service provider can simply select a claim policy in claim policy list 710, and any number of applications in the application list 720 to apply the selected claim policy to the selected applications. For example, the service provider may select claim policy A 711 and application A and application B, then click "apply" button 733 to apply the claim policy A to both application A 721 and application B 722 regardless of what protocol each of applications A and B 721, 722 implements. Similarly, the user can also clear the applied claim policy by clicking the "clear" button 734. Further, a user can also select to copy an existing claim policy to create a new claim policy using the "copy" button 731, or modify an existing claim policy using the "modify" button 732.

In some embodiments, the applying the at least one identity claim policy may include performing one or more transformations on the included at least one user attribute or group attribute or any constant value contained in the defined identity claim policy. The one or more transformations may include, but are not limited to: (1) an extraction transformation, (2) a regular text replacement transformation, (3) a to-upper-case transformation, and (4) a to-lower-case transformation.

An extraction transformation is generally directed to a procedure of copying data from one or more sources into a destination system which represents the data differently from the one or more sources. For example, the same data written in XML format may be extracted and transformed into JSON format, and vice versa. A RegexReplace transformation is a transformation that replaces part of a text string with a different text string. For example, the standard claim types may be named slightly differently under different identity authentication protocols. The system may use the RegexReplace transformation to transform the claim type names to be consistent with the claim type names that comply with different identification authentication protocols. Similarly, different identification authentication protocols may also have different case sensitive spelling requirements. The system may also be able to perform to-upper-case transformation, and to-lower-case transformation to transform the attribute and claim type defined in the claim policy, such that the transformed attribute and claim type would comply to the requirement of each particular identity authentication protocol.

As such, the users at the service provider do not need to have the knowledge of which identity authentication protocol is implemented at each application to define and apply the claim policies to each application. The identity provider determines which identity authentication protocol is implemented in each application, and based on the determination, the identity provider applies the claim policies to the application. FIG. 7 merely illustrates a simple example user interface 700. The additional or different user interface elements or different layout may be implemented to achieve the same or additional functions.

Figure 8:
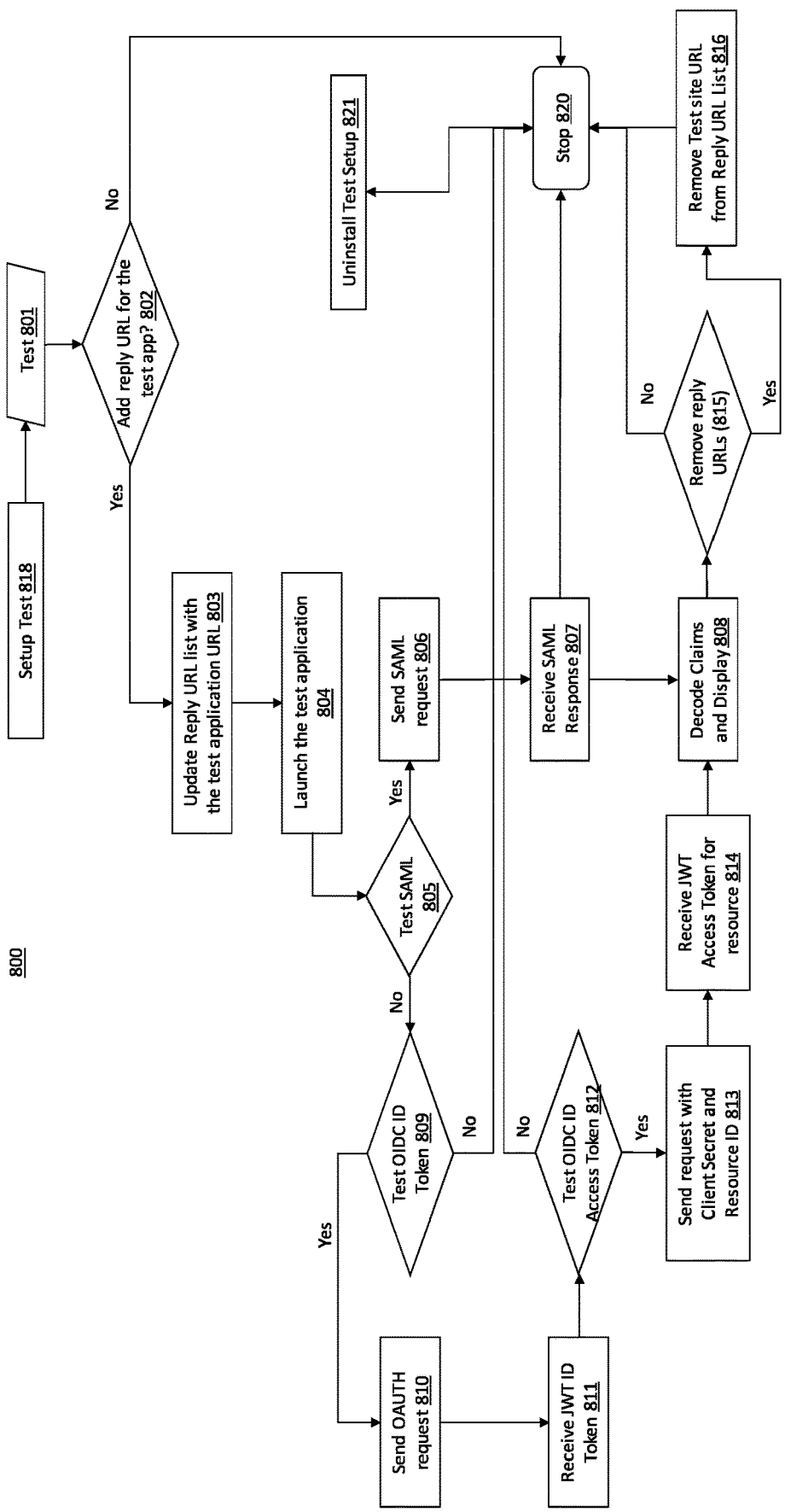
FIG. 8 illustrates a flowchart of an example testing mechanism that is configured to test a claim policy using a testing application.

Further, to make sure the generated claim policies will work as intended, the principles described herein also provide a testing mechanism that allows the users at the service provider to test the newly defined claim policies using a test application. FIG. 8 illustrates a flowchart 800 of an example testing mechanism. The testing mechanism may be performed at any one of the applications after a claim policy is applied to the application. The test mechanism generates test requests, traverses each of the multiple identity authentication protocols to generate a corresponding security token, and eventually decode each security token and displays the decoded claims to the user, such that the user can visually see whether the decoded claims are what the user has intended to receive, and whether the claim policy is properly construed.

As illustrated in FIG. 8, when a user initiates a testing process, the system setups a test framework (818). When a test is initiated (act 801), it is determined whether a testing application URL is to be added to the reply URL, which specifies where the test application expects to receive the responses and/or tokens (802). If the determination is no, the test stops (820). If the determination is yes, the reply URL is added with the test application URL (803), and the test application is launched (804). Once the test application is launched, each of the multiple identity authentication policies is traversed one at a time.

For example, as illustrated in FIG. 8, it is first determined whether a SAML token is to be tested (805). If the determination is yes, a SAML request is sent to the test application (806). Once the test application receives the SAML request, it sends a SAML response (i.e., token) back. After the test application receives the SAML response (807), the claim embedded in the SAML response is decoded and displayed to the user who has initiated the test (808).

On the other hand, if it is determined that SAML token is not to be tested, it is then determined whether OIDC ID token is to be tested (809). If it is determined that OIDC ID token is to be tested, an OIDC authorization request is sent to the test application (810). In response to the authentication request, the test application then receives an OICD ID token, which is often in JSON Web ID token (JWT) format (811). Next, it is then determined whether OICD ID access token is to be tested. If the determination is yes, a request is then sent with the client secret and resource ID (813). Once the client secret and resource ID are authenticated by the identity provider, a JWT access token for the resource may be generated and sent to the test application (814). After the JWT access token for the resource is received (814), the claims contained in the security token is then decoded and displayed to the user who has initiated the test (808). There may be additional identity authentication protocols (not shown) that may be implemented and tested.

Once the claim policy is tested under each of the multiple identity authentication protocols, the test URL may be removed, and the test may be terminated. As illustrated in FIG. 8, after the claims contained in the SAML response or OIDC ID token are decoded and displayed, it is then determined whether the test application URL is to be removed (815). If it is determined that the test application URL is to be removed, the test application URL is removed (816), and the testing stops (820). After the claims are successfully decoded and displayed to the user, the test framework may be uninstalled or removed (821).

The following discussion now refers to a number of methods and method acts that may be performed. Although the method acts may be disused in a certain order or illustrated in a flow chart as occurring in a particular order, no particular ordering is required unless specifically stated, or required because an act is dependent on another act being completed prior to the act being performed.

Figure 9:
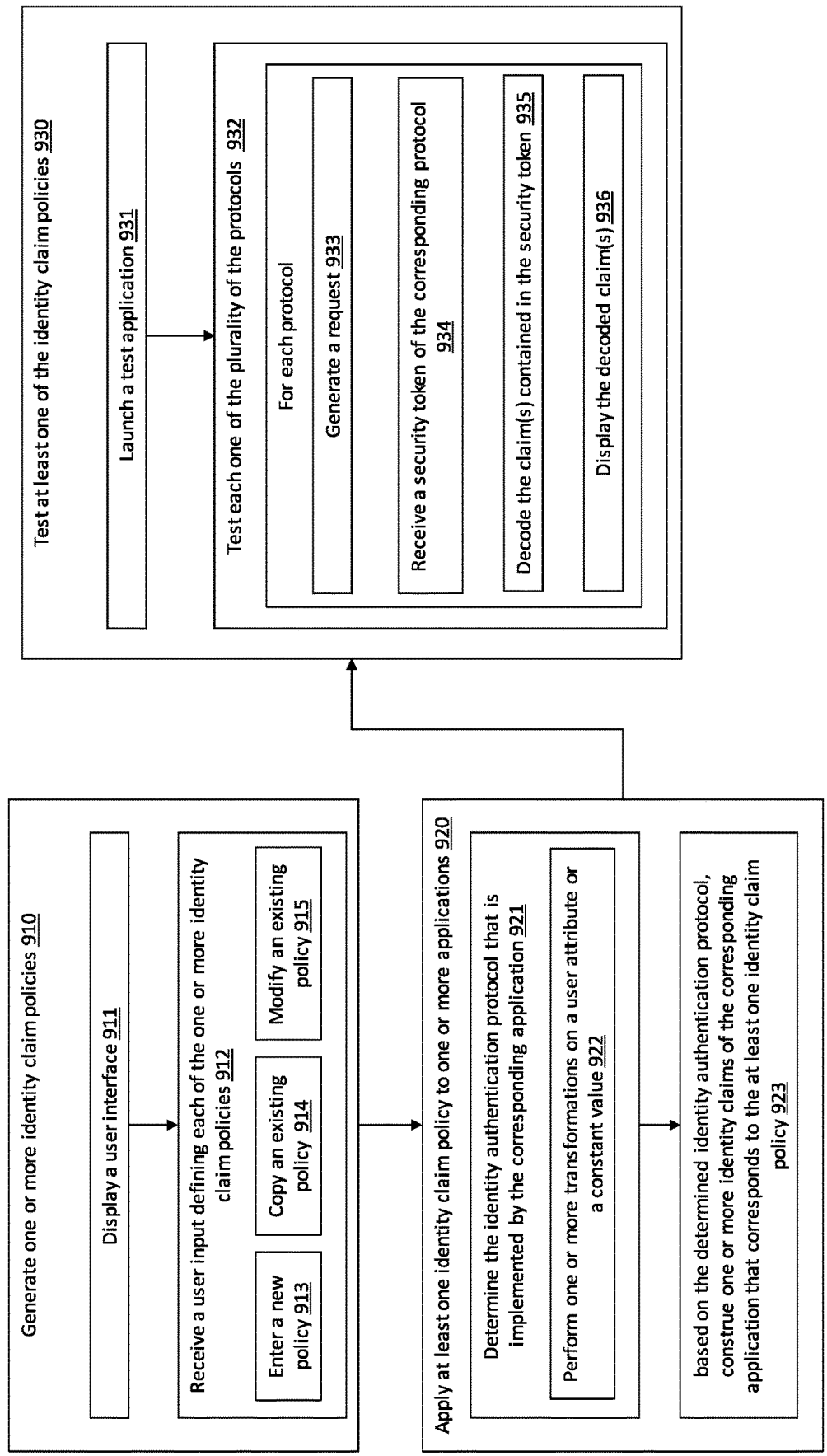
FIG. 9 illustrates a flowchart of an example method 900 for protocol-agnostic configuring one or more identity claim policies.

FIG. 9 illustrates a flowchart of an example method 900 for protocol-agnostic configuring one or more identity claim policies. The method 900 includes generating one or more identity claim policies (act 910) and applying at least one of the generated identity claim policies to one or more applications (act 920). The act of generating the one or more identity claim policies (act 910) may further include displaying a user interface (act 911), and receiving a user input defining each of the one or more identity claim policies (act 912). For example, the user interface may correspond to the example user interface 600 of FIG. 6. The service provider may be allowed to enter a new claim policy by inputting one or more attributes and respective claim types (act 913). The service provider may also be allowed copy an existing identity claim policy to generate a new policy (act 914) and/or modify an existing identity claim policy (act 915).

The act of applying at least one identity claim policy to one or more applications may include determining the identity authentication protocol that is implemented by the corresponding application (act 921). In some embodiments, the applying the at least one identity claim policy may include performing one or more transformations on the included at least one user attribute or group attribute or any constant value contained in the defined identity claim policy (act 922). The one or more transformations may include, but are not limited to: (1) an extraction transformation, (2) a regular text replacement transformation, (3) a to-upper-case transformation, and (4) a to-lower-case transformation. Based on the determined identity authentication protocol, construing one or more identity claims of the corresponding application that corresponds to the at least one identity claim policy (act 923). For example, if it is determined that the identity authentication protocol is the SAML protocol, the identity claims will be construed to be in XML, format; and if it is determined that the identity authentication protocol is the OIDC protocol, the identity claims will be construed to be in JWT format.

Further, the method 900 may also include testing at least one of the identity claim policies (act 930). The act of testing the at least one identity claim policy (act 930) includes launching a test application (act 931) and testing each one of the plurality of the protocols using the test application (act 932). In particular, for each protocol, a test request is generated (act 933). In response to the request, the identity provider generates a security token of the corresponding protocol. Once the test application receives the security token (act 934), the test application decodes the claim(s) contained in the security token (act 935) and displays the decoded claim(s) to the user (act 936).

Finally, because the principles described herein may be performed in the context of a computing system. For example, each of the client 110, identity provider 130, service provider 120, and relying party application 121 may be implemented at a computing system, some introductory discussion of a computing system will be described with respect to FIG. 10.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 10:
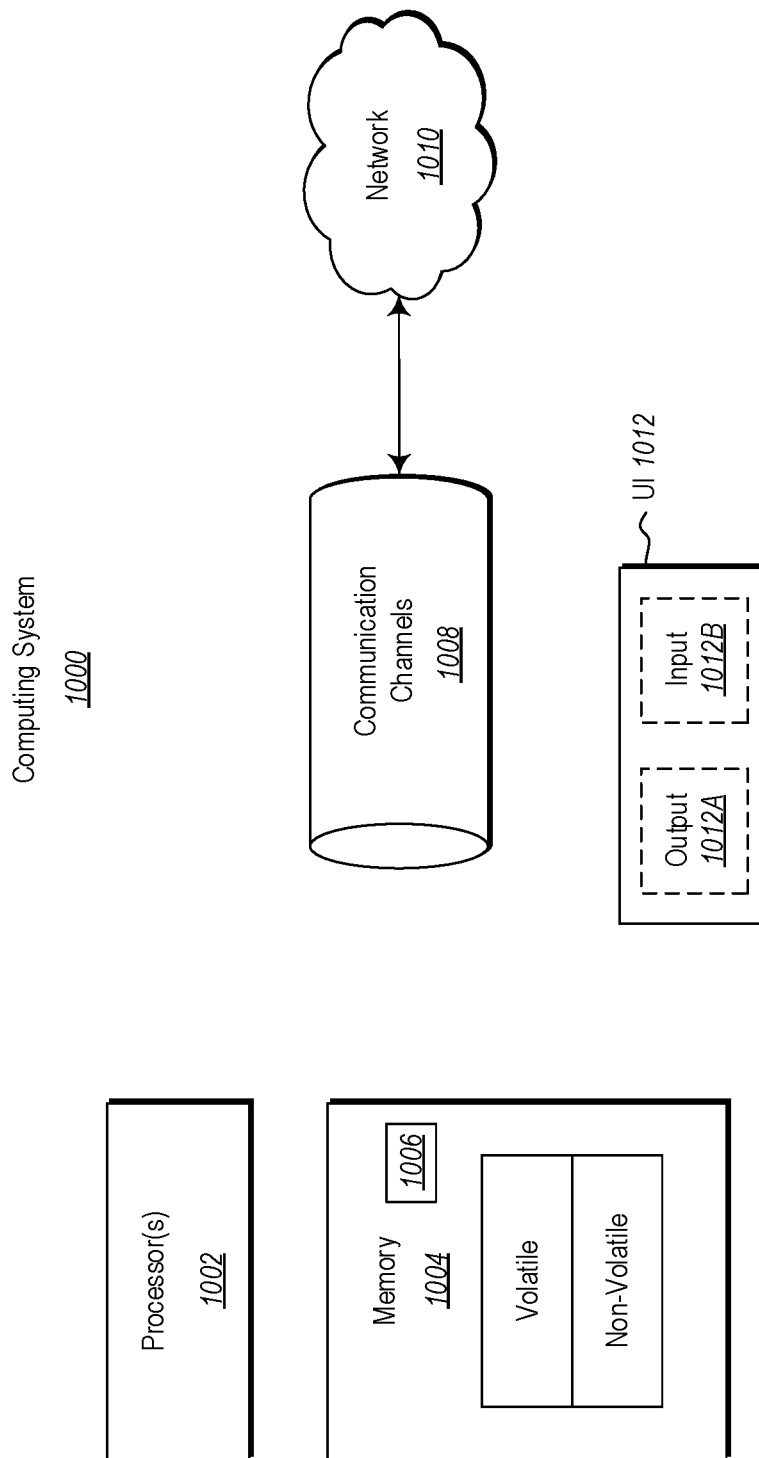
FIG. 10 illustrates an example computing system in which the principles described herein may be employed.

As illustrated in FIG. 10, in its most basic configuration, a computing system 100 typically includes at least one hardware processing unit 1002 and memory 1004. The processing unit 1002 may include a general-purpose processor and may also include a field-programmable gate array (FPGA), an application-specific integrated circuit (ASIC), or any other specialized circuit. The memory 1004 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1000 also has thereon multiple structures often referred to as an "executable component". For instance, memory 1004 of the computing system 1000 is illustrated as including executable component 1006. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hardwired logic gates. The computer-executable instructions (and the manipulated data) may be stored in the memory 104 of the computing system 1000. Computing system 1000 may also contain communication channels 1008 that allow the computing system 1000 to communicate with other computing systems over, for example, network 1100.

While not all computing systems require a user interface, in some embodiments, the computing system 1000 includes a user interface system 1012 for use in interfacing with a user. The user interface system 1012 may include output mechanisms 1012A as well as input mechanisms 1012B. The principles described herein are not limited to the precise output mechanisms 1012A or input mechanisms 1012B as such will depend on the nature of the device. However, output mechanisms 1012A might include, for instance, speakers, displays, tactile output, holograms and so forth. Examples of input mechanisms 1012B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 1000 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 1002 and memory 1004, as needed to perform their various functions.

As discussed above, each of the identity provider 130, the client 110, the service provider 120, and the relying party application 121 may include one or more computing systems 100. As such, the principles described herein are implemented in an environment including one or more computing systems that are configured to communicate with each other directly or indirectly via computer networks. In particular, the principles described herein may be implemented at an identity provider 130 to provide service providers 120 an improved claim policy configuration and verification functions that are protocol agnostic, which improves the functions of the computing systems of both the identity provider 130 and the service provider 120.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable hardware storage devices having thereon computer-executable instructions that are structured such that, when executed by the one or more processors, cause the computing system to perform at least:
   generate one or more protocol-agnostic identity claim policies;
   apply at least one of the one or more identity claim policies to one or more applications, each of the one or more applications implementing a particular identity authentication protocol that is one of a plurality of identity authentication protocols; and
   test at least one of the one or more identity claim policies after applying the at least one identity claim policy to the one or more applications,
   the applying the at least one identity claim policy comprising:
      for each of the one or more applications,
         determining the identity authentication protocol that is implemented by the corresponding application; and
         based on the determined identity authentication protocol, construing one or more identity claims of the corresponding application that corresponds to the at least one identity claim policy, and
   the testing the at least one identity claim policy that is applied to a particular application comprising:
      setting up a test framework into the particular application for generating test request; and
      for each of the plurality of protocols:
         generating a test request for accessing the test application;
         receiving a security token of the corresponding protocol, the security token including one or more identity claims;
         decoding the one or more identity claims contained in the security token; and
         displaying the decoded one or more identity claims.

2. The computing system of claim 1, the generating the one or more identity claim policies comprising:
   displaying a user interface; and
   receiving a user input at the user interface defining each of the one or more identity claim policies regardless of which identity authentication protocol is or is to be implemented at any particular application.

3. The computing system of claim 2, the defining the one or more identity claim policies further comprising:
   receiving a user input at the user interface copying an existing identity claim policy; and
   in response to the user input of copying the existing identity claim policy, generating a new identity claim policy that is identical to the existing identity claim policy.

4. The computing system of claim 2, the defining the one or more identity claim policies further comprising:
   receiving a user input at the user interface modifying an existing identity claim policy.

5. The computing system of claim 1, the applying at least one of the one or more identity claim policies to one or more applications further comprising:
   receiving a user indication that the at least one of the one or more identity claim policies is to be applied to one or more applications.

6. The computing system of claim 1, the at least one of the one or more identity claim policies includes at least one of (1) one or more user attributes, or (2) one or more group attributes.

7. The computing system of claim 6, the applying the at least one identity claim policy comprising:
   based on the authentication protocol implemented at one of the one or more applications, performing at least one of the following transformations on the included at least one user attribute, group attribute, or a constant value contained in the at least one identity claim policy: (1) an extraction transformation, (2) a regular text replacement transformation, (3) a to-upper-case transformation, and (4) a to-lower-case transformation.

8. The computing system of claim 1, wherein the at least one or more identity claim policies includes one or more conditions, and only when the one or more conditions are satisfied, a claim is emitted into a security token.

9. The computing system of claim 8, wherein one of the plurality of identity authentication protocols requires the security token to be written in a markup language format or in JSON Web Token (JWT) format.

10. The computing system of claim 9, wherein one of the plurality of identity authentication protocols requires the security token to be written in JSON Web Token (JW) format.

11. The computing system of claim 9, wherein the one of the plurality of identity authentication protocols is OpenID Connect authentication protocol.

12. The computing system of claim 1, the computing system further configured to:
in response to verifying an identity of a user that requests for service from one of the one or more applications, generate a security token that contains the one or more identity claims of the user based on the authentication protocol of the corresponding application.

13. The computing system of claim 12, the computing system further configured to:
send the security token to a client of the user based on the authentication protocol of the corresponding application.

14. The computing system of claim 12, the computing system further configured to:
send the security token to a service of the corresponding application based on the authentication protocol of the corresponding application.

15. The computing system of claim 1, the testing the at least one identity claim policy comprising:
in response to successful displaying the decoded one or more identity claims, removing the test framework.

16. A method implemented at a computing system for protocol-agnostic configuring an identity claim policy that is to be applied to one or more applications, according to one of a plurality of identity authentication protocols:
generating one or more protocol-agnostic identity claim policies;
applying at least one of the one or more identity claim policies to one or more applications, each of the one or more applications implementing a particular identity authentication protocol that is one of a plurality of identity authentication protocols;
testing at least one of the one or more identity claim policies after applying the at least one identity claim policy to the one or more applications,
the applying the at least one identity claim policy comprising:
for each of the one or more applications,
determining the identity authentication protocol that is implemented by the corresponding application; and
based on the determined identity authentication protocol, configuring one or more identity claims of the corresponding application that corresponds to the at least one identity claim policy and complies with the identity authentication protocol for the corresponding application, and
the testing the at least one identity claim policy that is applied to a particular application comprising:
setting up a test framework into the particular application for generating test request; and
for each of the plurality of protocols:
generating a test request for accessing the test application;
receiving a security token of the corresponding protocol, the security token including one or more identity claims;
decoding the one or more identity claims contained in the security token; and
displaying the decoded one or more identity claims.

17. A computer program product comprising one or more hardware storage devices having stored thereon computer-executable instructions that are structured such that, when executed by one or more processors of a computing system, the computer-executable instructions cause the computer system to perform at least:
generate one or more protocol-agnostic identity claim policies;
apply at least one of the one or more identity claim policies to one or more applications, each of the one or more applications implementing a particular identity authentication protocol that is one of a plurality of identity authentication protocols; and
test at least one of the one or more identity claim policies after applying the at least one identity claim policy to the one or more applications,
the applying the at least one identity claim policy comprising:
for each of the one or more applications,
determining the identity authentication protocol that is implemented by the corresponding application; and
based on the determined identity authentication protocol, configuring one or more identity claims of the corresponding application that corresponds to the at least one identity claim policy and complies with the identity authentication protocol for the corresponding application, and
the testing the at least one identity claim policy that is applied to a particular application comprising:
setting up a test framework into the particular application for generating test request; and
for each of the plurality of protocols:
generating a test request for accessing the test application;
receiving a security token of the corresponding protocol, the security token including one or more identity claims;
decoding the one or more identity claims contained in the security token; and
displaying the decoded one or more identity claims.

18. The method of claim 16, the generating the one or more identity claim policies comprising:
displaying a user interface; and
receiving a user input at the user interface defining each of the one or more identity claim policies regardless of which identity authentication protocol is or is to be implemented at any particular application.

19. The method of claim 18, the defining the one or more identity claim policies further comprising:
receiving a user input at the user interface copying an existing identity claim policy; and in response to the user input of copying the existing identity claim policy, generating a new identity claim policy that is identical to the existing identity claim policy.

20. The method of claim 18, the defining the one or more identity claim policies further comprising:
receiving a user input at the user interface modifying an existing identity claim policy.

\* \* \* \* \*